United States Patent [19]
Ginzburg et al.

[11] Patent Number: 6,078,919
[45] Date of Patent: Jun. 20, 2000

[54] METHOD AND APPARATUS FOR DELIVERY OF DATA OVER A NETWORK BASED ON DETERMINATION OF NETWORK PARAMETERS

[75] Inventors: Anna Y. Ginzburg, Berkeley Heights; Clifford Eric Martin, Martinsville, both of N.J.

[73] Assignee: Lucent Technologies Inc., Murray Hill, N.Y.

[21] Appl. No.: 08/956,722

[22] Filed: Oct. 23, 1997

[51] Int. Cl.[7] .................................................. G06F 17/30
[52] U.S. Cl. .......................... 707/10; 709/235; 709/226; 709/224; 709/219; 709/202; 709/102; 710/56; 710/45
[58] Field of Search ............................ 382/239; 348/419, 348/430; 707/10; 709/219, 226, 224, 235, 102, 202; 710/45, 56; 375/225

[56] References Cited

U.S. PATENT DOCUMENTS

| | | | |
|---|---|---|---|
| 4,047,243 | 9/1977 | Dijkstra | 364/200 |
| 4,502,117 | 2/1985 | Kihara | 364/200 |
| 5,266,947 | 11/1993 | Fujiwara et al. | 340/932.2 |
| 5,459,837 | 10/1995 | Caccavale | 395/184.01 |
| 5,563,961 | 10/1996 | Rynderman et al. | 382/239 |
| 5,592,626 | 1/1997 | Papadimitriou et al. | 395/200.13 |
| 5,621,820 | 4/1997 | Rynderman et al. | 382/239 |
| 5,627,858 | 5/1997 | Mak et la. | 375/225 |
| 5,680,596 | 10/1997 | Iizuka et al. | 395/559 |
| 5,721,815 | 2/1998 | Ottesen et al. | 395/200.13 |
| 5,724,514 | 3/1998 | Arias | 395/200.13 |
| 5,819,083 | 10/1998 | Chen et al. | 707/10 |
| 5,828,837 | 10/1998 | Eikeland | 395/200.13 |
| 5,838,994 | 11/1998 | Valizadeh | 395/876 |
| 5,854,895 | 12/1998 | Nishina et al. | 395/200.51 |

Primary Examiner—Thomas G. Black
Assistant Examiner—Jean M. Corrielus

[57] ABSTRACT

A request for transfer of data over a network is processed to obtain current values of network parameters such as aggregate network processing overhead and effective network bandwidth. In response to receipt of a data transfer request, the maximum size transport unit which can be sent over the network without packet loss is determined. The full maximum size transport unit is then sent over the network from, for example, a client to a server, in order to provide a measure of full size transport time. Similarly, a half size transport unit is sent over the network to provide a measure of half size transfer time. The fall and half size transfer times are then used to compute current values for the network processing overhead and effective network bandwidth parameters. The current values are processed to determine an internal buffer size to be allocated for use in receiving data transferred over the network in response to the request. The data transfer request is therefore processed in a manner which is substantially independent of the particular transmission protocol and medium used by the network, such that the techniques can be applied to any type of network.

20 Claims, 2 Drawing Sheets

METHOD AND APPARATUS FOR DELIVERY OF DATA OVER A NETWORK BASED ON DETERMINATION OF NETWORK PARAMETERS

FIELD OF THE INVENTION

The present invention relates generally to techniques for delivering data over a network, and more particularly to network data delivery techniques which utilize information on network conditions, such as network processing overhead and effective network bandwidth, in order to facilitate data delivery.

BACKGROUND OF THE INVENTION

In a typical network-based data delivery system, data is delivered from one or more servers to a network client in response to a request from a user associated with the network client. The network may be a wide area network utilizing Asynchronous Transfer Mode (ATM) or Transmission Control Protocol/Internet Protocol (TCP/IP) techniques, a local area network such as Ethernet, a cable network, telephone network, direct broadcast satellite (DBS) network or any other mechanism through which data can be delivered from the server to the client. The data may be in the form of continuous media data, such as video and audio data configured in accordance with MPEG-2 or other standards, as well as numerous other types of information. An increasingly important application of network-based data delivery is video-on-demand systems in which users can request delivery of movies or other video programming at any time.

A significant problem in existing systems for delivering data over networks is that the server and its operating software are typically designed for optimum performance with only one type of network or at most only a few different types of networks. For example, a conventional server optimized for operation with an ATM network may not be suitable for use with an Ethernet network. The particular server selected for use in a given application is likely to be dependent on factors such as the transmission protocol and the transmission medium, and the selected server will generally not be readily adaptable for use in a wide variety of applications. As a result, different servers need to be used to deliver data over different types of networks, which increases the cost and complexity of network-based data delivery systems.

It is therefore apparent that a need exists for network data delivery techniques which are protocol independent and transport medium independent, such that the same techniques can be used for delivering data over a wide variety of different types of networks.

SUMMARY OF THE INVENTION

The invention processes data transfer requests such that the same or similar techniques may be used to facilitate data delivery over many different types of networks. In an illustrative embodiment, a data transfer request from a user is received in a network client. The network client first determines a maximum size transport unit which can be sent over the network substantially without packet loss, as well as a number of times which such a transport unit should be sent in order to generate an accurate average measure of the network transfer time. The client then sends the full maximum size transport unit over the network the designated number of times, and averages the measured transfer times to generate an average full size transfer time. The client also sends a half size transport unit over the network the designated number of times, and averages the measured transfer times to generate an average half size transfer time. The average full and half size transfer times are used to compute current values of network parameters such as aggregate network processing overhead and effective network bandwidth. The current values of these network parameters are then used to determine an optimal size of an internal buffer within the client which will be allocated for use in receiving data transferred from a server over the network in accordance with the data transfer request. If the current values of the network parameters indicate that the data transfer request cannot be accommodated by the network at the bit rate requested by the user, the request may be rejected or delayed.

The network data delivery techniques of the present invention are substantially independent of the transmission protocol and transmission medium used in a given application. As a result, the techniques can be used for delivering data over many different types of networks, including ATM and Ethernet networks. These and other features and advantages of the present invention will become more apparent from the accompanying drawings and the following detailed description.

Detailed Description of the Invention

Figure 1:
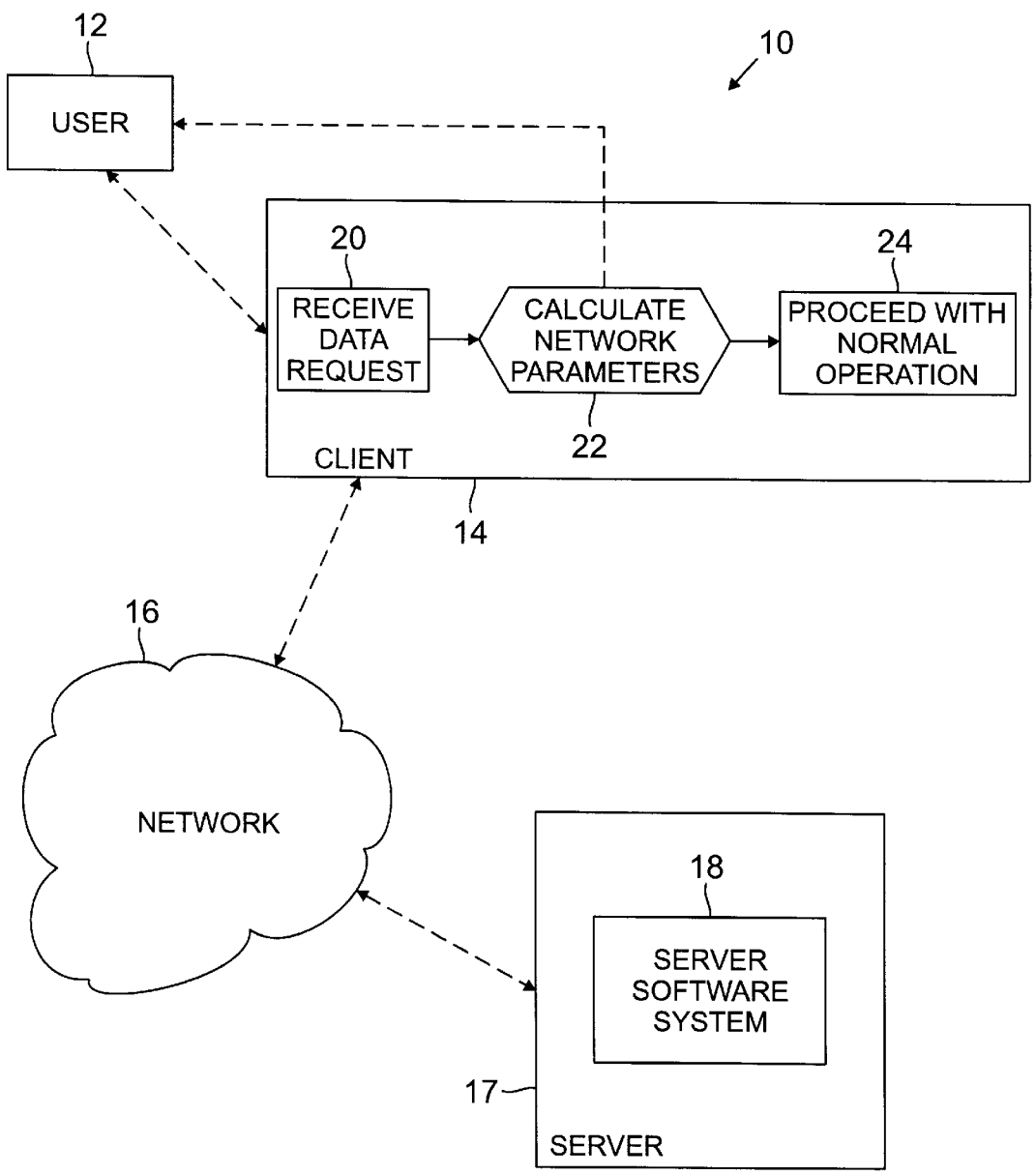
FIG. 1 is a block diagram of a data delivery system in accordance with the invention.

The invention will be illustrated using an exemplary system in which a network client processes a data request from a user associated with the client. It should be understood, however, that the invention may be applied to numerous other types of systems arranged in a variety of other configurations. For example, the invention is applicable to web servers which deliver information to a user over the Internet in accordance with the Hypertext transport Protocol (HTTP) and Transmission Control Protocol/Internet Protocol (TCP/IP) standards, to video-on-demand applications in which audio-video programming is delivered to a user through a cable system to a television set-top box associated with the user, and to data storage applications in which a client delivers data over a network for storage in a central database.

The terms "client" and "server" as used herein are intended to include any type of personal computer, workstation, microcomputer, mainframe computer or other suitably-programmed digital data processor capable of processing a data request received from a user. A client in accordance with the invention may thus be a television set-top box associated with a given user, and a server may be a video server associated with a cable system head end or a direct broadcast satellite terminal. The term "network" as used herein is intended to include global computer networks such as the Internet, local computer networks such as Ethernet networks, telephone networks, cable networks, DBS networks or any other transmission medium suitable for supporting client-server communication. A "network client" refers generally to a client which receives or delivers data over one or more networks. A "data request" or "data transfer request" as the terms are used herein are intended to include a request for video, audio or any other type of data as well as various combinations of different types of data. The term "transport unit" as used herein is intended to include not only data units but also control messages and any other grouping of information which may be transported in a network.

As noted above, conventional data delivery techniques are generally either transmission protocol-dependent or transmission medium-dependent. These conventional techniques are therefore usually not suitable for delivering data over different types of networks, such as both ATM and Ethernet networks. The present invention makes use of a network parameter determination to permit the delivery of data over a wide variety of different types of networks, in a manner which is substantially independent of the underlying transmission protocol and medium. The invention generates and uses information about current network conditions in order to determine whether a network can in fact support a given data transfer request. If it is determined that the network can support the data transfer request, various network parameters are measured and then processed to determine the best possible client or server internal buffer size to optimize the requested transfers. The invention thus takes a "snapshot" of the network conditions existing just prior to initiation of a data transfer, and optimizes the actual data transfer by calculating internal buffer size based on information collected very close to the time of transfer. The measurements and calculations are applicable to any type of network and to delivery of any type of data.

FIG. 1 shows an exemplary system 10 in which the data delivery techniques of the invention may be implemented. The system 10 includes a user 12, a network client 14, a network 16 and a server 17. The user 12 may represent an actual individual using the system 10, or a piece of terminal equipment, such as a computer, television or other display, storage or processing device associated with a system user. In this illustrative embodiment, the user 12 sends a data request to the network client 14. The data request in this example will be assumed without limitation to be a request for delivery of a video program encoded in accordance with the MPEG-2 standard. The network client 14 determines if the network 16 can support delivery of the requested data, in a manner to be described in greater detail below. If the network 16 can support the request, the network client 14 sends the request to a server software system 18 of server 17 over the network 16. The server software system 18 processes the request, and delivers the requested data via the network 16 to the network client 14.

The network client 14 executes a number of operations 20, 22 and 24 prior to sending the data request over the network 16. In operation 20, the network client 14 receives the data request from the user 12. In operation 22, the network client calculates a number of network parameters in order to determine if the network 16 has sufficient bandwidth to deliver the requested data at the desired bit rate, and that other current conditions on the network 16 are such that the request can be handled. This determination will be described in greater detail below in conjunction with the flow diagram of FIG. 2. If operation 22 indicates that the data request cannot be handled by the network, the network client 14 rejects the request and transmits a corresponding rejection message back to the user 12. If the request can be handled, the network client 14 proceeds with its normal operation as shown at 24, and delivers the data request over the network 16 for processing by the server software system 18.

Figure 2:
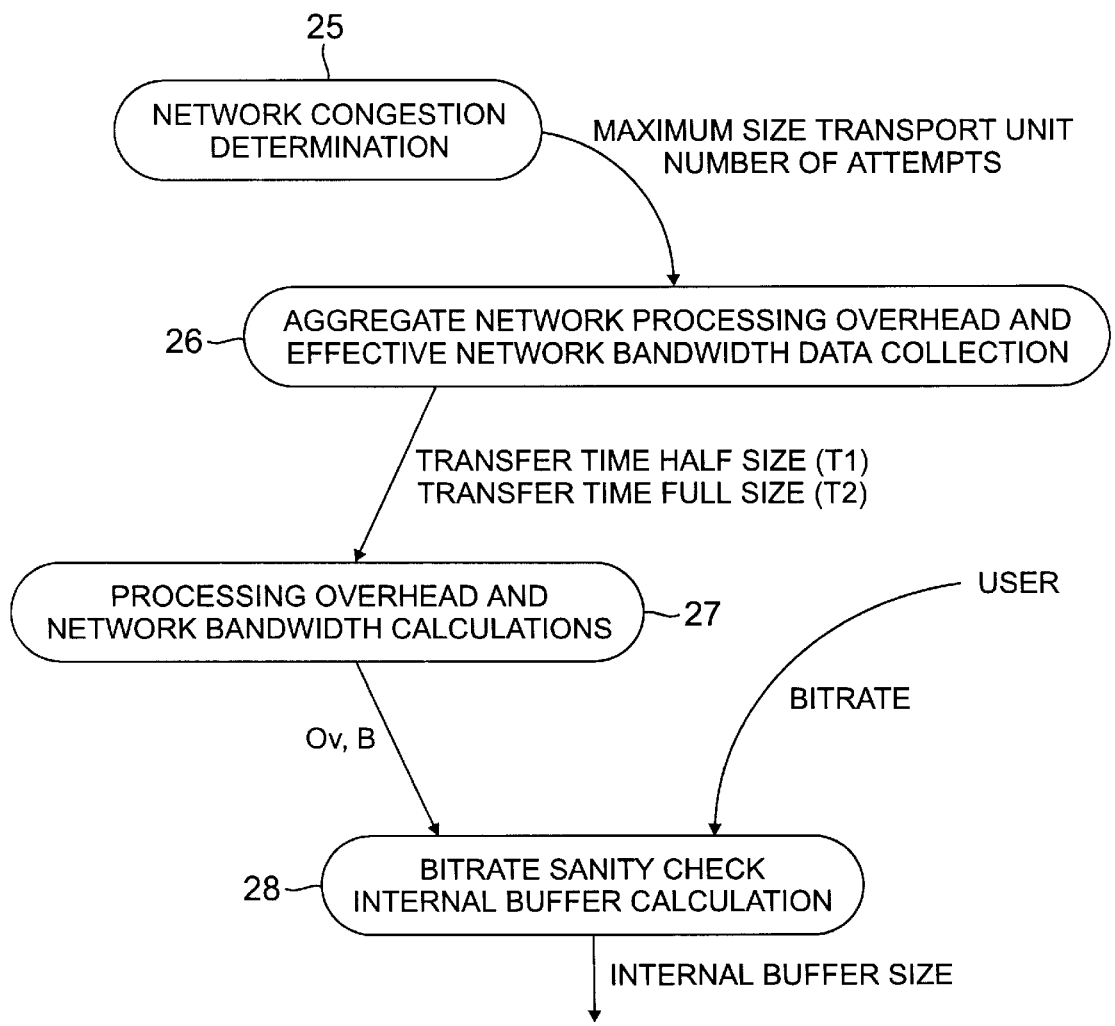
FIG. 2 is a flow diagram illustrating a network parameter determination process in accordance with the invention.

FIG. 2 illustrates the process of determining network parameters in operation 22 of network client 14. In step 25, the network client 14 determines the congestion on the network 16. This step involves determining a "maximum size transport unit," measured in bytes, that can be sent without substantial packet loss over the network 16. This determination may be based on prior measurement or experience with a particular network. The maximum size transport unit is used in a data collection operation, to be described in conjunction with step 26, which is associated with the calculation of network parameters. Step 25 also involves determining the number of times that a given transport unit should be sent, referred to as "number of attempts," during the data collection operation in order to obtain an acceptable transfer time measurement. The number of attempts is an important parameter because the resolution of computer timing devices can be very poor, such that if the time interval utilized for measurement of network parameters is too small, the data collection results may be invalid. The maximum size transport unit and number of attempts are inputs to the next step of the network parameter determination process.

Step 26 involves collecting data on the aggregate network processing overhead and effective network bandwidth. This data is collected by first timing the transfer of half of the maximum size transfer unit, and then timing the transfer of the full maximum size transfer unit. The transfer times may be one-way transmit times measured between the network client 14 and the server 17, although other suitable measures, including round-trip transfer times, could also be used. The transfers for each of the half size and full size transfer units are performed "number of attempts" times, as determined in step 25, and the results are averaged in order to obtain an accurate average measurement of the transfer time. The output of step 26 is the following two transfer times: (1) the half size transfer time (T1), which is the average amount of time it took to transfer one-half of the maximum size transfer unit from client 14 to server 17 over the network 16; and (2) the full size transfer time (T2), which is the average amount of time it took to transfer the full maximum size transfer unit over from client 14 to server 17 over the network 16. In alternative embodiments, other transport units having sizes less than that of the maximum size transport unit may be used for measuring transfer times.

Step 27 performs processing overhead and network bandwidth calculations using the two transfer times T1 and T2 determined in step 26. These calculations are carried out using the following equations:

$$T1 = Ov + \left(\frac{Unit\ Size}{2B}\right)$$

$$T2 = Ov + \left(\frac{Unit\ Size}{B}\right)$$

in which T1 and T2 are the transfer times determined in step 26, Ov is the aggregate network processing overhead time, Unit Size is the size of the maximum size transport unit as determined in step 25, and B is the effective network bandwidth. The above two equations are solved for the two unknowns Ov and B, using the values of T1, T2 and Unit Size as determined from the previous process steps. It should be noted that the T1 and T2 values used in the above equations may be multiplied by the "number of attempts" prior to insertion in the above equations. In such an implementation, the resulting value of effective network bandwidth B will be unchanged because the "number of attempts" will cancel out. However, the Ov value, which in accordance with the above equations may be expressed as 2T1–T2, will represent the aggregate overhead required to send "number of attempts" transfers rather than a single transfer. This implementation therefore provides additional margin in the determination of internal buffer size to be described below.

Step 28 uses the network processing overhead Ov and effective network bandwidth B as determined in step 27 to perform a "sanity check" and an internal buffer calculation. First, the calculated effective network bandwidth B is compared to the bit rate requested by the user 12 in order to make sure that the network 16 can accommodate the requested data transfer bit rate. If the network can accommodate the requested bit rate, the calculated aggregate network processing overhead time and the requested bit rate are then used to determine the optimal size of an internal buffer to be allocated for use with the data request. This portion of the memory of the network client 14 may then be set aside or otherwise allocated or designated for use as an internal buffer for receiving the requested data delivered over the network 16 under the control of the server software system 18. The internal buffer size determination will be described in greater detail below in conjunction with an example of the network parameter determination process of FIG. 2.

Figure 3:
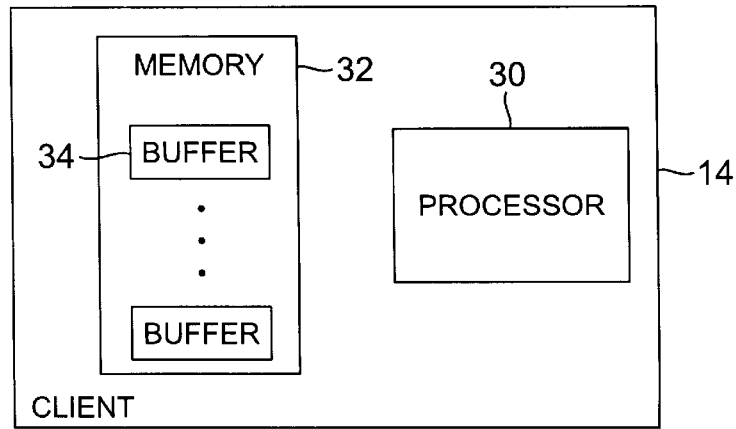
FIG. 3 illustrates a network client suitable for performing the process of FIG. 2.

FIG. 3 is a block diagram illustrating an exemplary network client 14 in greater detail. The network client 14 includes a processor 30 which may be, for example, configured to execute computer software instructions involved in performing the network parameter calculations described in conjunction with FIG. 2 above. The network client 14 also includes a memory 32. The memory 32 includes a number of internal buffers 34 which have been allocated to accommodate data transfers associated with media requests of one or more clients. The size of the portion of a given internal buffer 34 associated with a given media request may be established in accordance with the optimal internal buffer size determined in step 28 of FIG. 2.

An example of the above-described network parameter determination, as applied to an ATM network, will now be described. The network congestion determination of step 25 of FIG. 2 in the exemplary ATM network yields a maximum size transport unit of 1.25 Mbytes and a "number of attempts" of six. The maximum size transport unit in this example was assumed to be one second of bytes at a user bit rate R of 10 Mbits/second, or 1.25 Mbytes. The number of attempts in this example was found by determining the number of times a half size transport unit of 625 Kbytes could be sent until the total time to transfer exceeded one second. In accordance with step 26, a half size transport unit of 625 Kbytes was sent over the network six times, yielding six measured values which were averaged to provide an average value of 0.1732162 seconds. This average value was multiplied by the "number of attempts" or six to generate a T1 value of 1.039297 in accordance with the alternative implementation described above. The fall size transport unit of 1.25 Mbytes was also sent over the network six times, and the six measured values were averaged to provide an average value of 0.3399685 seconds. This average value was also multiplied by six to generate a T2 value of 2.039811. The T1 and T2 values were then processed in accordance with step 27 of FIG. 2, using the two equations given above, to determine values for aggregate network processing overhead time Ov and effective network bandwidth B. Solving the two equations for Ov and B in this example yields values of 0.038783 seconds and 29.984588 Mbits/second, respectively. The internal buffer size S may then be calculated in accordance with the following exemplary equation:

$$S = buffer\_cushion(buf\_size + (Ov*0.125*R))$$

in which buffer_cushion is a tolerance factor which may be on the order of 1.2; R is the 10 Mbits/second bit rate requested by the user; buf_size is the amount of buffer required to hold one half-second of bytes, that is, R/16; and 0.125 is a conversion factor for converting bits to bytes. Applying the foregoing equation to the values in this example yields an internal buffer size S of 808.174 Kbytes for the requested user bit rate R of 10 Mbits/sec. Other buffer size equations may be used to calculate the internal buffer size S in alternative embodiments.

It should be noted that techniques other than those described may be used to measure and process the transfer times T1 and T2. For example, the "number of attempts" may be selected as any value which has been determined to yield an accurate averaged transfer time measurement in a given network. Also, as previously noted, the T1 and T2 values need not be generated by multiplying an average transfer time by the "number of attempts" value. Instead, the T1 and T2 values may each represent average transfer times for single transfers, which would reduce the amount of overhead Ov computed in accordance with the above equations but would generally leave the result of the effective network bandwidth B computation unchanged.

Alternative embodiments of the invention may perform a network parameter determination such as that described in conjunction with FIG. 2 prior to delivery of data from a client to a server, from a client to a database or other storage location, or from one client to another client. In addition, invention may be implemented in software, hardware or firmware, as well as in various combinations thereof. Furthermore, alternative transport unit timing measurements may be utilized, including measurements based on the transfer of one or more relatively small control messages, which may be less than about 50 to 100 bytes in size. In one possible example of such an embodiment, the average transfer time of a control message is measured and then extrapolated to estimate transfer times of the larger transport units. The above-described embodiments of the invention are thus intended to be illustrative only. Numerous other alternative embodiments within the scope of the following claims will be readily apparent to those skilled in the art.

What is claimed is:

1. A method of processing a request for transfer of a designated set of data from a server over a network, the method comprising the steps of:

measuring transfer times of at least first and second transport units sent by a client through at least a portion of the network prior to the client sending the data transfer request to the sever, the second transport unit having a size different than that of the first transport unit;

processing the measured transfer times to obtain a current value of at least one network parameter, by solving a set of equations involving the measured transfer times, the size of at least one of the first and second transport units, and the at least one network parameter; and utilizing the current value of the network parameter to determine a buffer size for use in receiving the designated set of data transferred over the network in response to the request.

2. The method of claim 1 wherein the at least one network parameter includes an aggregate network processing overhead and an effective network bandwidth.

3. The method of claim 1 wherein the measuring step further includes the step of sending a substantially half size transport unit and a substantially full size transfer unit over the network, wherein the half size and full size transport units are used to measure corresponding half size and full size transfer times.

4. The method of claim 3 wherein the processing step includes processing the half size and full size transport units to obtain current values of aggregate network processing overhead and network bandwidth.

5. The method of claim 4 wherein the current values of aggregate network processing overhead and network bandwidth are determined by solving the equations:

$$T1 = Ov + \left(\frac{Unit\ Size}{2B}\right)$$

$$T2 = Ov + \left(\frac{Unit\ Size}{B}\right)$$

in which T1 and T2 are the half size and full size transfer times, Ov is the network processing overhead, Unit Size is the size of the full size transport unit, and B is the effective network bandwidth.

6. The method of claim 1 further including the step of determining a maximum size transport unit which can be sent over the network substantially without packet loss, wherein one of the first and second transport units sent in the sending step corresponds to the maximum size transport unit.

7. The method of claim 1 further including the step of determining a number of times a given one of the transport units should be sent over the network in order to generate a sufficiently accurate measurement of the corresponding transfer time.

8. The method of claim 7 wherein the measuring and processing steps include sending the given transport unit over the portion of the network the determined number of times, measuring an average transfer time by averaging transfer times of one or more of the transport units sent in the sending step, and processing the average transfer time to obtain the current value of the network parameter.

9. The method of claim 1 further including the step of rejecting the data transfer request if the current value of the network parameter indicates that the request cannot be accommodated by the network.

10. The method of claim 1 further including the step of rejecting the data transfer request if a comparison of the current value of an effective network bandwidth with a requested bit rate of the data transfer request indicates that the request cannot be accommodated by the network.

11. An apparatus for processing a request for transfer of a designated set of data from a server over a network, the apparatus comprising:
 a processor operative to measure transfer times of at least first and second transport units sent by a client through at least a portion of the network prior to the client sending the data transfer request to the server, the second transport unit having a size different than that of the first transport unit, and to process the measured transfer times to obtain a current value of at least one network parameter by solving a set of equations involving the measured transfer times, the size of at least one of the first and second transport units, and the at least one network parameter; and
 a memory associated with the processor, the memory including at least one internal buffer allocated for use in receiving the designated set of data transferred over the network in response to the request, wherein the size of the allocated internal buffer is determined based on the current value of the network parameter.

12. The apparatus of claim 11 wherein the at least one network parameter includes an aggregate network processing overhead and an effective network bandwidth.

13. The apparatus of claim 11 wherein the processor is further operative to send a substantially half size transport unit and a substantially fall size transfer unit over the network, wherein the half size and fall size transport units are used to measure corresponding half size and full size transfer times.

14. The apparatus of claim 13 wherein the processor is further operative to process the half size and full size transport units to obtain current values of aggregate network processing overhead and network bandwidth.

15. The apparatus of claim 14 wherein the current values of aggregate network processing overhead and network bandwidth are determined by solving the equations:

$$T1 = Ov + \left(\frac{Unit\ Size}{2B}\right)$$

$$T2 = Ov + \left(\frac{Unit\ Size}{B}\right)$$

in which T1 and T2 are the half size and full size transfer times, Ov is the network processing overhead, Unit Size is the size of the fill size transport unit, and B is the effective network bandwidth.

16. The apparatus of claim 11 wherein the processor is further operative to determine a maximum size transport unit which can be sent over the network substantially without packet loss, wherein one of the first and second transport units sent by the processor corresponds to the maximum size transport unit.

17. The apparatus of claim 11 wherein the processor is further operative to determine a number of times a given one of the transport units should be sent over the network in order to generate a sufficiently accurate measurement of the corresponding transfer time.

18. The apparatus of claim 17 wherein the processor is further operative to send the given transport unit over the portion of the network the determined number of times, to measure an average transfer time by averaging transfer times of one or more of the transport units and to process the average transfer time to obtain the current value of the network parameter.

19. The apparatus of claim 11 wherein the processor is further operative to reject the data transfer request if the current value of the network parameter indicates that the request cannot be accommodated by the network.

20. The apparatus of claim 11 wherein the processor is further operative to reject the data transfer request if a comparison of the current value of an effective network bandwidth with a requested bit rate of the data transfer request indicates that the request cannot be accommodated by the network.

* * * * *